Dec. 12, 1933.  E. F. KINGSBURY  1,939,060
MODULATING SYSTEM
Filed May 24, 1930

INVENTOR
E. F. KINGSBURY
BY
G. H. Heydt
ATTORNEY

Patented Dec. 12, 1933

1,939,060

UNITED STATES PATENT OFFICE 1,939,060

MODULATING SYSTEM

Edwin F. Kingsbury, Rutherford, N. J., assignor to Bell Telephone Laboratories, Incorporated, New York, N. Y., a corporation of New York Application May 24, 1930. Serial No. 455,229

5 Claims. (Cl. 179—100.3)

This invention relates to a method and apparatus for modulating the output of a light sensitive device by means of a magnetic field.

In known systems for the communication of intelligence, such as picture transmission systems and film sound reproducing systems, a source of steady unvarying light modulated by some agency external to the source excites a light sensitive device. The light sensitive device, which is generally some form of photoelectric cell, changes the variations in the light into variations in an electric current. The light source has heretofore generally been an incandescent electric lamp operated from a source of power unvarying in magnitude, such as a storage battery. There are practical advantages to be secured by the operation of such lamps on alternating current, but attempts to use an alternating current source have not been successful due to the production in the output of the photoelectric cell of a component having twice the frequency of the alternating current supply.

The object of this invention is to neutralize the undesirable disturbances in the output of a photoelectric cell due to variations in the supply of power to the exciting lamp without appreciably affecting desired variations in the output of the cell having the same frequency as the undesired variations. For convenience of description, the invention has been shown embodied in a system for reproducing sound from a film sound record, but it will be apparent that the invention may be applied to many other systems.

An incandescent electric lamp preferably using a heavy, low voltage, filament operated on alternating current is used to excite a photoelectric cell. The output of the photoelectric cell will then contain a component of double the frequency of the alternating current. A magnetic field excited by an alternating current of suitable magnitude and phase supplied by the same source as supplies the heating current to the filament of the lamp is applied externally to the photoelectric cell. The externally applied magnetic field will produce a modulation of the current of the photoelectric cell, as shown in U. S. Patent 1,658,843, patented February 14, 1928 to F. Gray. By suitably adjusting the magnitude and phase of the applied magnetic field, the undesired component may be neutralized without appreciably affecting the desired components of the same frequency.

Figure 1:
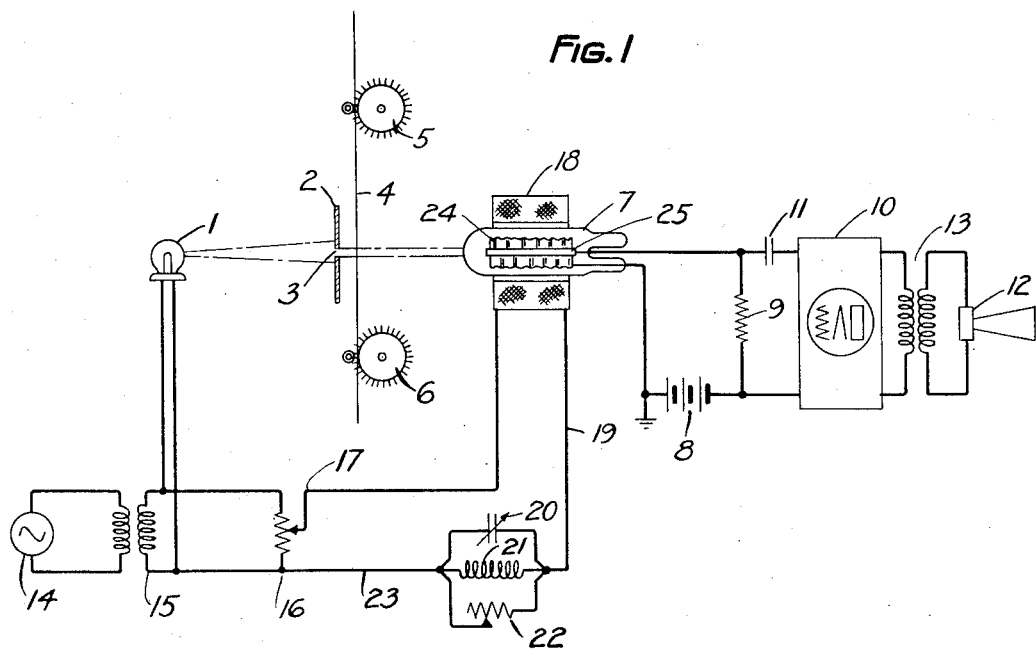
Figure 2:
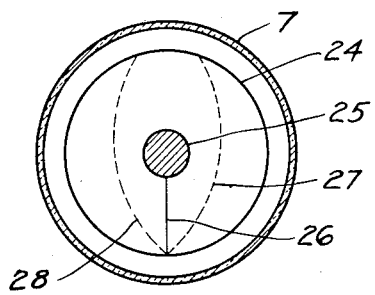

In the drawing, Fig. 1 shows a typical embodiment of the invention applied to a film sound reproducing equipment. Fig. 2 is a cross section of the photoelectric cell shown in Fig. 1.

In Fig. 1 an incandescent electric lamp 1 illuminates an aperture plate 2 having a narrow slit 3 through which a narrow beam of light passes to a photographic sound record 4 of any known type. The sound record 4 is passed through the light beam at a uniform and constant speed by any suitable mechanism such as the mechanism diagrammatically indicated by the toothed sprockets 5 and 6. The beam of light, after being modulated by the sound record 4 excites a photoelectric cell 7 and causes an electric current modulated in accordance with the variation in the light passing through the record 4 to flow in the circuit comprising the battery 8, resistance 9 and photoelectric cell 7. The variations in potential difference produced by the modulated current between the ends of the resistance 9 are applied to the input of a thermionic amplifier 10 through a coupling condenser 11. After suitable amplification in the amplifier 10, the amplified currents operate a sound radiator 12. An impedance matching transformer 13 may be inserted if desired between the output of the amplifier 10 and the sound radiator 12.

The filament of the exciting lamp 1 is bridged across the secondary of a transformer 15, the primary of which is supplied with alternating current from a convenient source 14. Also bridged across the secondary of the transformer 15 is a potential divider 16. The movable arm of the potential divider 16 is connected by a wire 17 to one end of the winding of an electromagnet 18. The other end of the winding of the electromagnet 18 is connected by a wire 19 to a phase shifting network comprising a condenser 20, an inductance 21 and a resistance 22 connected in parallel. The phase shifting network is connected to the potential divider 16 by a wire 23.

A convenient form of construction of the photoelectric cell 7 is described in U. S. Patent 1,658,843, issued February 14, 1928 to F. Gray. A cross section of a cell of this type is shown in Fig. 2. The cell comprises a glass vessel 7, generally cylindrical in shape, which may be evacuated or filled with a suitable gas at a low pressure. The cathode 24 may consist of a cylinder or suitable material coated with an appropriate substance which, under the influence of light, emits photoelectrons or the cathode may consist of such substance coated directly on the walls of the glass vessel 7. The anode 25 is a metallic rod mounted in the center of the cathode 24. Suitable conductors are sealed through the glass envelope 7 to provide connections with the electrodes 24 and 25.

The light emitted by the filament of the exciting lamp 1 will increase and decrease with each half cycle of the alternating current supplied by the transformer 15. This increase and decrease in the light emitted from the lamp 1 will tend to cause the current flowing in the photoelectric cell 7 to increase and decrease accordingly, and thus produce a hum in the sound radiator 12 having a frequency double the frequency of the alternating current.

The electromagnet 18 is preferably so located as to produce a magnetic field along the axis of the cell 7. When located in this position, the effect of the magnetic field on the current flowing in the cell is most pronounced although other locations of the electromagnet 18 with respect to the cell 7 would produce similar effects on the current flowing in the cell. The effect of the magnetic field on the current flowing in the cell is believed to be due to the reactions discussed hereafter, but the invention is not to be considered as limited by these theoretical deductions. Considering a smal area of the photo-sensitive surface, when a light falls on this area electrons will be emitted. Due to the positive potential impressed on the anode 25 by the battery 8, when the magnetic field due to the electromagnet 18 is zero, the electrons will be drawn over to the anode approximately in a straight line as indicated by the line 26 in Fig. 2. If a magnetic field produced by the electromagnet 18 flows axially along the tube in a direction down into the plane of the cell in Fig. 2, the electrons will be deflected to the right as along the path indicated by the dotted line 27 and some will thus fail to reach the anode. The current flowing from the cathode 24 to the anode 25 of the cell will thus be reduced in magnitude. However, as both the exciting lamp 1 and the electromagnet 18 obtained their power from the same transformer 15, the magnetic field will gain in strength at the same time as the emission of electrons increases due to the increase in the light emitted by the lamp 1. By suitably adjusting the magnitude and phase relation of the magnetic field by means of the potential divider 16 and phase shifting network 20, 21 and 22, the decrease in current due to the increase in the strength of the magnetic field may be made equal to the increase in current due to the increased light and the resultant current flowing from the output of the cell may be kept substantially constant. When the next half cycle of the alternating current reverses the direction of the magnetic field, the electron stream will be deflected to the left and some of the electrons will follow the path indicated by the dotted line 28 in Fig. 2. The current in the cell will again decrease to compensate for the increased emission due to the increase in the light emitted by the lamp 1.

With no film in the projector the magnitude and phase of the current supplied to the electromagnet 18 are adjusted until the effect on the current flowing in the cell of the variation in the light emitted by the lamp 1 due to variations in the power supply is substantially neutralized by the effect on the same current of the variations in the magnetic field from the electromagnet 18 due to the same variations in the power supply. When a film sound record is passing through the projector, however, the light emitted by the lamp 1 is modulated also by the film sound record. This additional variation in the light reaching the photoelectric cell will not be neutralized by the magnetic field of the electromagnet 18 and will thus produce an unbalance condition resulting in a modulation of the current flowing in the photoelectric cell 1 which may be amplified and reproduced. Thus, while the magnetic field produced by the electromagnet 18 will compensate for variations in the current flowing in the photoelectric cell caused by variations in the power supply the modulation of the current due to the sound record is not affected to any appreciable degree.

What is claimed is:

1. In combination, a source of electric power varying in magnitude, an exciting lamp energized by said power, a photographic record, means for moving said record through the light emitted by said lamp, a photoelectric cell excited by the light passing through said record to produce an electric current and magnetic means operating on the current excited in said cell to neutralize the variations produced in said current by the variations in the light emitted by said lamp without appreciably affecting variations in said current due to said record.

2. In combination, a source of electric power varying in magnitude, an exciting lamp energized by said power, a photographic record, means for moving said record through the light emitted by said lamp, a photoelectric cell excited by the light passing through said record to produce an electric current and magnetic means energized by said source of power and operating on said current to neutralize the variations produced in said current by the variations in the light emitted by said lamp without appreciably affecting variations in said current due to said record.

3. In combination, a source of electric power varying in magnitude, an exciting lamp energized by said power, a photographic record, means for moving said record through the light emitted by said lamp, a photoelectric cell excited by the light passing through said record to produce an electric current, an electromagnet energized by said source of power and operating on said current and means to control the magnitude and phase relation of the field produced by said electromagnet to neutralize the variations produced in said current by the variations in the light emitted by said lamp without appreciably affecting variations in said current due to said record.

4. The method of operating a photosensitive device which comprises exciting said device with light derived from a source of electric power varying in magnitude, energizing a magnetic field with power from said source and adjusting the magnitude and phase of said magnetic field to substantially neutralize undesired components in the output of said device due to the variation in said power.

5. In combination, a source of electric power varying in magnitude, a lamp energized by said power, a photosensitive device excited by light from said lamp, means external to said lamp for modulating said light and magnetic means energized by said source of power to substantially neutralize the variations in the output of said device caused by variations in said power.

EDWIN F. KINGSBURY.